US 8,259,373 B2

(12) United States Patent
Jung

(10) Patent No.: US 8,259,373 B2
(45) Date of Patent: Sep. 4, 2012

(54) SOFT PROOFING METHOD AND APPARATUS TO PERFORM COLOR MATCHING BETWEEN INPUT IMAGE DATA AND A PRINTED OUTPUT IMAGE

(75) Inventor: Joo-young Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 926 days.

(21) Appl. No.: 11/493,803

(22) Filed: Jul. 27, 2006

(65) Prior Publication Data

US 2007/0052987 A1     Mar. 8, 2007

(30) Foreign Application Priority Data

Sep. 6, 2005 (KR) .................. 10-2005-0082622

(51) Int. Cl.
*G03F 3/10* (2006.01)
*G09G 5/02* (2006.01)
*G06F 3/00* (2006.01)

(52) U.S. Cl. ......... 358/527; 358/1.9; 358/518; 358/537; 358/519; 358/520; 382/162; 382/167; 715/274; 715/700; 345/589

(58) Field of Classification Search .................. 358/1.9, 358/406, 504, 515, 527, 531, 537, 540, 1.13, 358/1.15; 382/165, 167; 715/273, 274, 700; 345/594
See application file for complete search history.

(56) References Cited

U.S. PATENT DOCUMENTS 5,027,196 A * 6/1991 Ono et al. ...................... 358/527
5,898,436 A * 4/1999 Stewart et al. ................. 345/594

(Continued)

FOREIGN PATENT DOCUMENTS

JP     10-32724     2/1998

(Continued)

OTHER PUBLICATIONS

Vale Photographic Club: "Colour Management and printing—Adobe Photoshop CS2"[Online] Jun. 26, 2008, pp. 1-17, XP002488537 Retrieved from the Internet: URL:http://www.vale-photographic-club.co.uk/Colour%20management%20v2.pdf> [retrieved on Jun. 26, 2008].*

(Continued)

*Primary Examiner* — Kimberly A Williams
(74) *Attorney, Agent, or Firm* — Stanzione & Kim, LLP

(57) ABSTRACT

An image processing method of reproducing an image displayed on a screen of a display unit on a printing medium used by an image forming device includes displaying a preview window on the screen of the display unit, displaying the image in the preview window, and printing the image having the same colors as those displayed in the preview window using the image forming device. In addition, an image processing apparatus usable with a display unit and an image forming device includes a data capture unit to capture data of at least a portion of an image displayed on a screen of the display unit, and a color adjustment unit to convert the image displayed on the screen of the display unit to an image having the same colors as those of an image displayed in a preview window by adjusting the colors of the image displayed on the screen of the display unit based on the image data captured by the data capture unit, and to output the converted image to the image forming device.

33 Claims, 7 Drawing Sheets

U.S. PATENT DOCUMENTS

| | | | | |
|---|---|---|---|---|
| 6,023,527 | A * | 2/2000 | Narahara | 382/167 |
| 6,166,719 | A * | 12/2000 | Cariffe | 345/690 |
| 6,175,375 | B1 * | 1/2001 | Able et al. | 347/132 |
| 6,266,103 | B1 * | 7/2001 | Barton et al. | 348/675 |
| 6,456,802 | B1 * | 9/2002 | Phillips | 399/27 |
| 6,462,748 | B1 * | 10/2002 | Fushiki et al. | 345/604 |
| 6,600,574 | B2 | 7/2003 | Miyano | |
| 6,947,158 | B1 * | 9/2005 | Kitamura et al. | 358/1.15 |
| 7,292,369 | B2 * | 11/2007 | Yokoyama et al. | 358/1.9 |
| 7,525,685 | B2 * | 4/2009 | Maniam et al. | 358/1.9 |
| 7,538,917 | B2 * | 5/2009 | Rich et al. | 358/518 |
| 7,583,405 | B2 * | 9/2009 | Harrington et al. | 358/1.9 |
| 7,598,964 | B2 * | 10/2009 | Olson | 345/594 |
| 7,612,912 | B2 * | 11/2009 | Rumph et al. | 358/1.9 |
| 7,821,690 | B2 * | 10/2010 | Yamada et al. | 358/527 |
| 8,013,871 | B2 * | 9/2011 | Olson | 345/594 |
| 8,014,013 | B2 * | 9/2011 | Owen et al. | 358/1.15 |
| 2002/0029242 | A1 * | 3/2002 | Seto | 709/203 |
| 2002/0180751 | A1 * | 12/2002 | Rozzi | 345/589 |
| 2003/0043414 | A1 * | 3/2003 | Brady | 358/3.06 |
| 2003/0053097 | A1 * | 3/2003 | Ohga et al. | 358/1.9 |
| 2003/0053683 | A1 * | 3/2003 | Newman et al. | 382/162 |
| 2003/0103081 | A1 * | 6/2003 | Ebuchi | 345/764 |
| 2005/0076299 | A1 * | 4/2005 | Simpson et al. | 715/527 |
| 2005/0174587 | A1 * | 8/2005 | Hara | 358/1.9 |
| 2005/0185837 | A1 * | 8/2005 | Takano et al. | 382/162 |
| 2006/0087666 | A1 * | 4/2006 | Maniam et al. | 358/1.9 |
| 2006/0109497 | A1 * | 5/2006 | Ferlitsch et al. | 358/1.15 |
| 2006/0232836 | A1 * | 10/2006 | Yamada et al. | 358/527 |
| 2007/0195361 | A1 * | 8/2007 | Tomomatsu | 358/1.15 |
| 2008/0062193 | A1 * | 3/2008 | Olson | 345/591 |
| 2008/0062442 | A1 * | 3/2008 | Olson | 358/1.9 |
| 2008/0062443 | A1 * | 3/2008 | Olson | 358/1.9 |
| 2008/0084570 | A1 * | 4/2008 | Cho et al. | 358/1.9 |
| 2008/0151282 | A1 * | 6/2008 | Natori | 358/1.9 |

FOREIGN PATENT DOCUMENTS

| | | |
|---|---|---|
| JP | 11-78132 | 3/1999 |
| JP | 2003-87591 | 3/2003 |
| JP | 2005-167550 | 6/2005 |
| KR | 2004-3225 | 1/2004 |

OTHER PUBLICATIONS

Adobe Systems Incorporated: "Press Release: Adobe Photoshop CS2 Now Shipping"[Online] Apr. 27, 2005, pp. 1-2, XPOO24B8538 Retrieved from the Internet: URL:http://www.adbbe.com/aboutadobe/pressr oom/pressreleases/pdfs/2OO504/O427OSPhotoshop.pdf> [retrieved on Jun. 24, 2008] the whole document.*

Korean Office Action dated Nov. 20, 2006 issued in KR 2005-82622.

Chinese Office Action dated Sep. 14, 2007 issued in CN 2006101267566.

U.S. Appl. No. 11/181,790 entitled "Method of Automatically Processing Image and Apparatus Using the Method"; filed Jul. 15, 2005.

* cited by examiner

FIG. 5

| BRIGHTNESS |
| --- |
| CONTRAST |
| SATURATION |
| COLOR BALANCE (R-C) |
| COLOR BALANCE (G-M) |
| COLOR BALANCE (B-Y) |
| R-GAMMA 1D TABLE |
| G-GAMMA 1D TABLE |
| B-GAMMA 1D TABLE |
| SKIN (BRIGHTNESS) |
| SKIN (CHROMA) |
| SKIN (COLOR TONE) |
| SKY (BRIGHTNESS) |
| SKY (CHROMA) |
| SKY (COLOR TONE) |
| GRASS (BRIGHTNESS) |
| GRASS (CHROMA) |
| GRASS (COLOR TONE) |

SOFT PROOFING METHOD AND APPARATUS TO PERFORM COLOR MATCHING BETWEEN INPUT IMAGE DATA AND A PRINTED OUTPUT IMAGE

CROSS-REFERENCE TO RELATED APPLICATIONS

This application claims the benefit of Korean Patent Application No. 10-2005-0082622, filed on Sep. 6, 2005, in the Korean Intellectual Property Office, the disclosure of which is incorporated herein in its entirety by reference.

BACKGROUND OF THE INVENTION

1. Field of the Invention

The present general inventive concept relates to an image processing system, and more particularly, to an image processing method and apparatus to print an image with the same colors as those displayed on a display screen.

2. Description of the Related Art

Each monitor, scanner, and printer has a different range of expressible colors. Thus, a color which can be expressed by a monitor may not be expressed by a printer, and vice versa. Hard proof and soft proof methods have been developed to solve these problems. These proof methods are used to print an image on a printing medium with the same colors as those displayed on a monitor. The hard proof is a method of confirming reproduced colors of an image by directly printing the image using a printer. The soft proof is a method that allows a user watching a monitor to directly check the colors of an image to be printed on a printing medium via the monitor by providing a color preview function.

Graphic editing software, such as Adobe Photoshop or Correl Draw, is an image processing application which provides soft proof methods to users. A conventional soft proof method using this image processing application will now be schematically described.

An image processing application having a conventional soft proof function includes an input profile, a monitor profile, and a printer profile. When a digital image obtained by a scanner is provided as a file, the image processing application performs color conversion of the digital image using the input profile. The input profile is used to color-convert an image of a device-dependent color space to an image of a device-independent color space. The monitor profile and the printer profile are used to color-convert the image of the device-independent color space to a second image of a second device-dependent color space.

The device-dependent color spaces include an RGB color space and a CMYK color space. The RGB color space is used to express a digital image obtained by a scanner and reproduce colors on a monitor. The CMYK color space is used for printing. A CIE Lab color space and a CIE XYZ color space defined by International Color Consortium (ICC) are device-independent and called a Profile Connection Space (PCS) or a PCS color space, respectively. Image data converted using the input profile is expressed in the PCS color space. Thus, a device-independent color adjustment can be performed using the image processing application having the conventional soft proof function.

The image processing application sets the monitor profile when performing soft proof of the image data. The monitor profile can be set by a user selecting one of a plurality of ICC monitor profiles. After the monitor profile is set, the image processing application provides a dialogue box on a monitor screen, thereby allowing the user to perform a color adjustment, e.g., adjustment of brightness, contrast, and saturation. The image processing application performs the adjustment of brightness, contrast, and saturation in response to a color adjustment command input by the user through the dialogue box. By doing this, for a single digital image, the reproduced colors of an image displayed on the monitor screen match the reproduced colors of an image printed on a printing medium. Thus, as a result of the soft proof, the user can see that the colors of the image expressed on the monitor are the same as the colors of the printed image.

As described above, when the soft proof is performed using the graphic editing software, such as Adobe Photoshop or Correl Draw, an image displayed on a monitor screen and an image printed on a printing medium have almost the same colors regardless of color spaces of the monitor and printer.

However, when a user does not have the graphic editing software, the user cannot use the soft proof function, and the user prints a displayed image without the soft proof function. In addition, the user may be prevented from using the software due to high costs of the software.

Japanese Patent Publication No. H11-078132 discloses a conventional printer driver having a printer setting unit setting printer setting conditions of a printer through a menu screen, a memory unit storing printer setting information set by the printer setting unit together with a print file name, and a compensation unit compensating for printing information based on the printer setting information and the print file name when printing.

The conventional printer driver provides a dialogue box allowing a user to change setting items like brightness, contrast, and saturation, but does not provide a soft proof function for color matching between an image printed on a printing medium and an image displayed on a monitor. In addition, the conventional printer driver cannot perform a fine color adjustment because information on a change sequence of the setting items is not stored.

SUMMARY OF THE INVENTION

The present general inventive concept provides an image processing method of finely performing soft proof even without using graphic editing software such as Adobe Photoshop or Correl Draw.

The present general inventive concept also provides an image processing apparatus to finely perform soft proof even without using graphic editing software such as Adobe Photoshop or Correl Draw.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an image processing method of reproducing an image displayed on a screen of a display unit on a printing medium used by an image forming device, the method comprising displaying a preview window on the screen of the display unit, displaying an image to be printed in the preview window, and printing the image having the same colors as the colors of the image displayed in the preview window using the image forming device.

The image forming device may be a printer or a multi-function product having a printer function.

The foregoing and/or other aspects of the present general inventive concept may also be achieved by providing an image processing apparatus used together with a display unit and a printer, the apparatus comprising a data capture unit to capture data of at least a portion of an image displayed on a screen of the display unit, and a color adjustment unit to convert the image displayed on the screen of the display unit to an image having the same colors as those of an image displayed in a preview window by adjusting the colors of the image displayed on the screen of the display unit based on the image data captured by the data capture unit, and to output the converted image to the printer.

The foregoing and/or other aspects of the present general inventive concept may also be achieved by providing an image processing method usable with an image processing apparatus, the method comprising capturing data of at least a portion of an image displayed on a screen of a display unit to be printed in an image forming device, and converting the image displayed on the screen of the display unit to a second image having the same colors as those of an image displayed in a preview window by adjusting the colors of the image displayed on the screen of the display unit based on the captured data, and outputting the converted image to the image forming device.

The foregoing and/or other aspects of the present general inventive concept may also be achieved by providing an image processing apparatus usable with a display unit and an image forming device, the apparatus comprising an application unit to generate first image data of a first image, an image processing unit to generate second image data of a second image to be displayed in a display unit, and to generate a window to display the second image therein, a data capture unit to capture at least a portion of the second image data of the second image as third image data of a third image, a color adjustment unit to adjust at least one of parameters of colors of the third image, and to control the image processing unit to display fourth image data of a fourth image in the preview window according to the adjusted at least one of the parameters, and a printer driver to convert the first image data of the first image into fifth image data of a fifth image having the same colors of the fourth image as printing data according to the adjusted at least one of the parameters of the color adjustment unit, and to output the printing data to the image forming device.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 5 is a view illustrating items which can be adjusted through the dialogue box of FIG. 4;

DETAILED DESCRIPTION OF THE PREFERRED EMBODIMENTS

Figure 1:
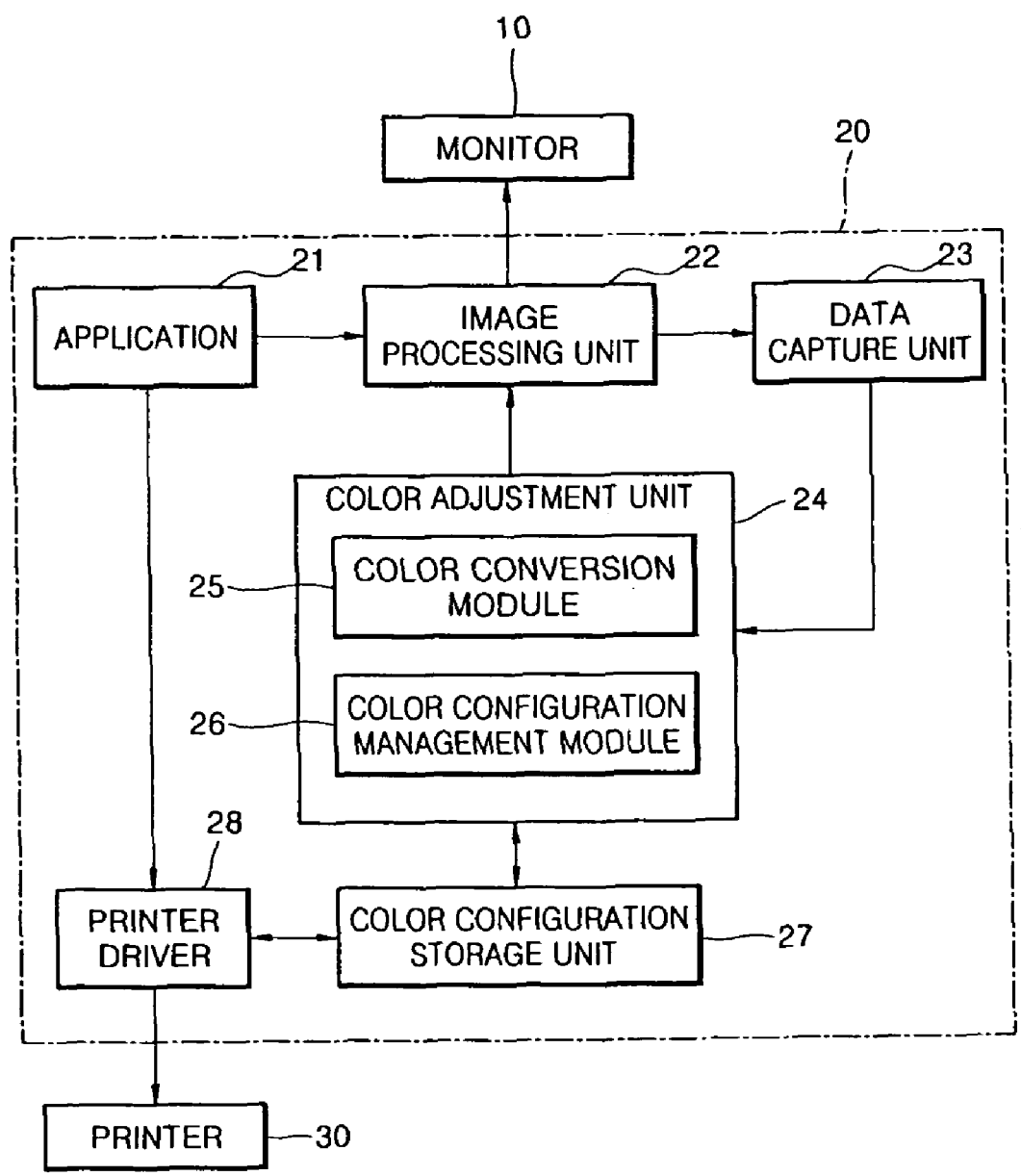
FIG. 1 is a functional block diagram illustrating an image processing system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a functional block diagram illustrating an image processing system according to an embodiment of the present general inventive concept. Referring to FIG. 1, the image processing system may include a monitor 10, a host computer 20, and a printer 30. The host computer 20 includes an application 21, an image processing unit 22, a data capture unit 23, and a color adjustment unit 24 which constitute an image processing apparatus. The application 21 may be an application program unit having a general graphic editing application, such as Microsoft Paint Shop, which does not have a soft proof function. The image processing unit 22 signal-processes first image data of a first image, such as a digital document, provided from the application 21 to display the signal processed first image on a screen of a monitor 10 as second image data of a second image. The image processing unit 22 also signal-processes third image data of a third image output from the color adjustment unit 24 to display the signal processed third image on the screen of the monitor 10 as fourth image data of a fourth image. The data capture unit 23 captures the third image data corresponding to at least a portion of the first image displayed on the screen of the monitor 10 from the image processing unit 22. The color adjustment unit 24 changes color configuration parameters using the third image data captured by the data capture unit 23. The color adjustment unit 24 includes a color conversion module 25 and a color configuration management module 26. The color configuration management module 26 changes the color configuration parameters in response to an input of a user using the host computer 20 and outputs the changed color configuration parameters to the color conversion module 25. The color conversion module 25 performs a color conversion of the third image data captured by the data capture unit 23 based on the color configuration parameters. The color-converted image data is fed back to the image processing unit 22 as the fourth image.

The host computer 20 further includes a color configuration storage unit 27 and a printer driver 28. The color configuration storage unit 27 stores the color configuration parameters output from the color adjustment unit 24. The printer driver 28 receives the first image data of the digital document from the application 21. The printer driver 28 generates printing data from the received first image data based on the color configuration parameters stored in the color configuration storage unit 27 and outputs the generated printing data to a printer 30.

The data capture unit 23, the color adjustment unit 24, the color configuration storage unit 27, and the printer driver 28 illustrated in FIG. 1 may construct a preview scope, which is the image processing apparatus for the soft proof according to the present embodiment. Although FIG. 1 illustrates a functional block diagram for convenience of description of the current embodiment, it will be easy for those of ordinary skill in the art to understand that the host computer 20 of FIG. 1 is implemented using a personal computer including a central processing unit (CPU), a memory, a hard disk, a keyboard, and a mouse. Thus the description of a physical configuration of the components of FIG. 1 is omitted.

An operation of the image processing system of FIG. 1 will now be described with reference to FIGS. 2 through 7.

A digital document may be obtained from a scanner or a digital camera, may be a photograph, may have an RGB color space, and may be stored as a file in a hard disk (not shown) of the host computer 20. When a user opens a photograph file stored in the hard disk of the host computer 20 using the application 21 which does not have the soft proof function, an application window 31 is displayed on the screen of the monitor 10 to display the first image corresponding to the opened file. When the preview scope, which is a soft proof apparatus according to the present embodiment, is activated by the user clicking a mouse (not shown) on the application window 31, a preview scope window 32 is displayed on the screen of the monitor 10. While the preview scope window 32 is being displayed on the screen of the monitor 10, the user can make at least a portion of the preview scope window 32 overlap the application window 31 by moving the preview scope window 32 by using the mouse. By overlapping the windows 31 and 32, the user can adjust colors of a portion of the first image displayed in the application window 31 or the second image displayed in the preview scope window 32. The image processing unit 22 may control the monitor 10 to display the application window 31 and the preview scope window 32.

A total image displayed on the screen of the monitor 10 may be used for the color adjustment performed by the color adjustment unit 24. However, if only a portion of the total image displayed on the screen is used, an operation of matching colors of the image displayed on the screen with colors of an image to be printed can be performed with a small data processing amount.

The preview scope used in the present embodiment is disclosed in U.S. patent application Ser. No. 11/181,790 entitled "METHOD OF AUTOMATICALLY PROCESSING IMAGE AND APPARATUS USING THE METHOD" filed on Jul. 15, 2005, the disclosure of which is incorporated herein in its entirety by reference.

Figure 2:
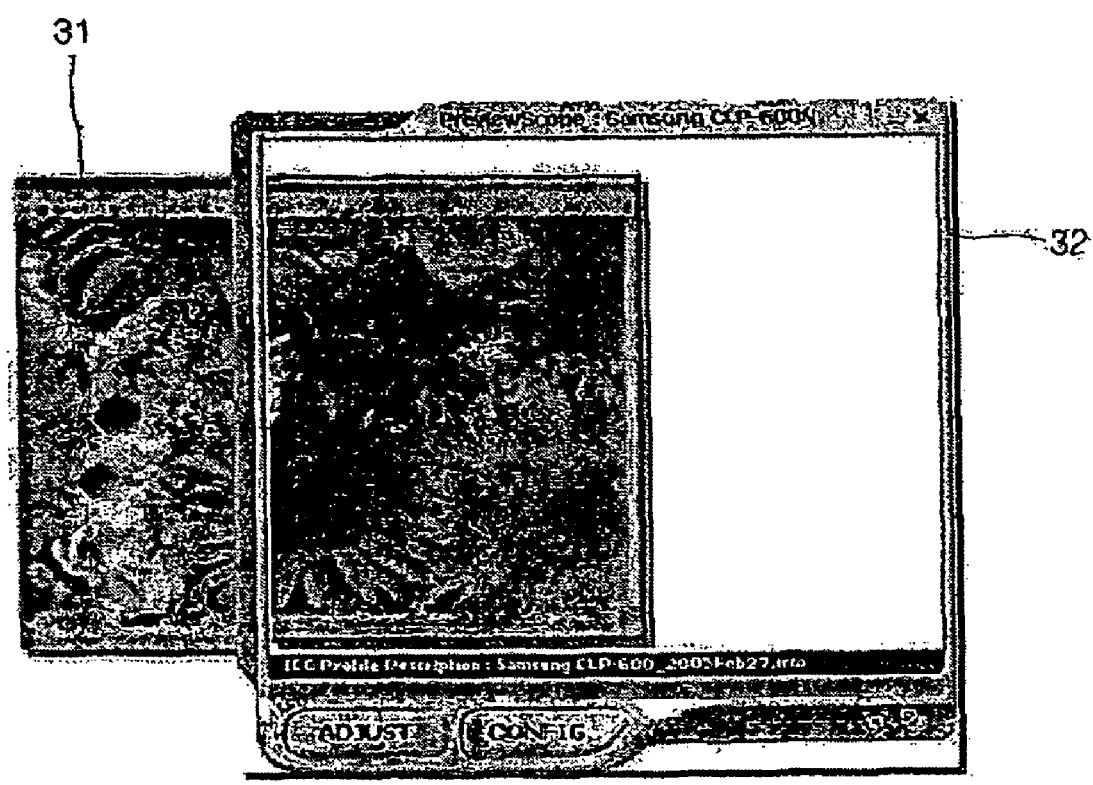
FIG. 2 is a view illustrating an application window, a portion of which overlaps with a preview scope window in the image processing apparatus of FIG. 1.
Figure 3:
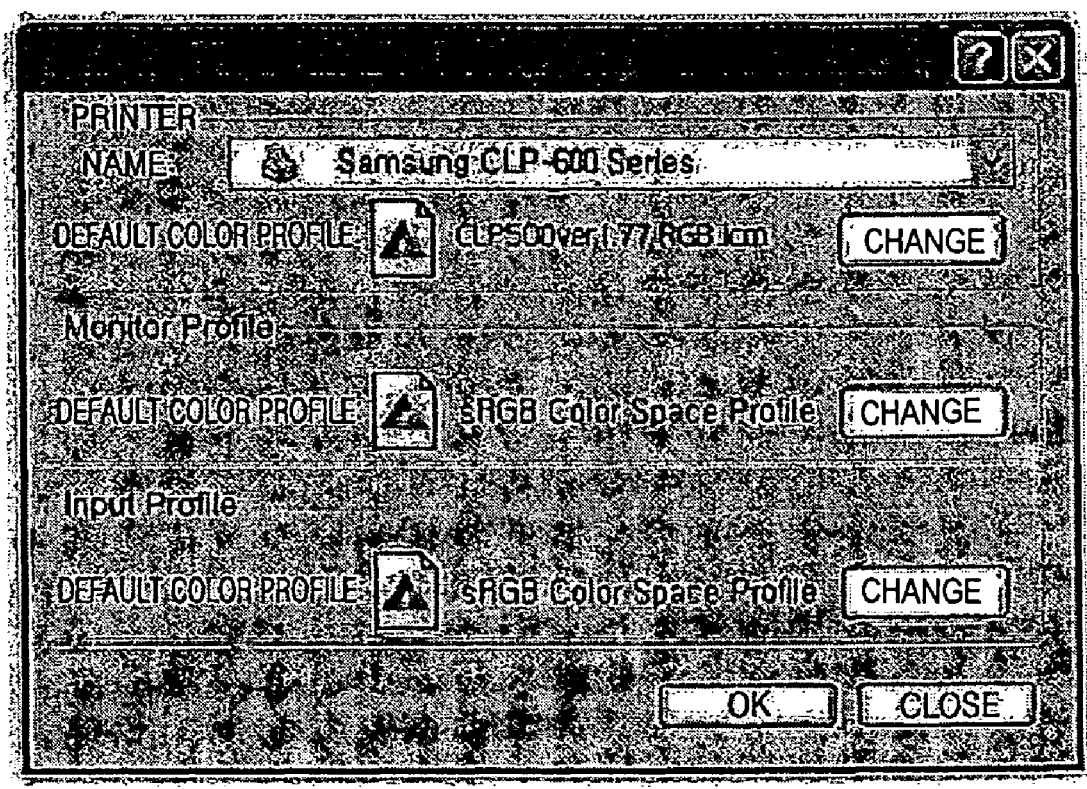
FIG. 3 is a view illustrating a printer profile, a monitor profile, and an input profile in the image processing apparatus of FIG. 1.

In a state illustrated in FIG. 2, when the user presses a configuration button CONFIG of the preview scope window 32, the color adjustment unit 24 controls the image processing unit 22 so that a dialogue box illustrated in FIG. 3 is displayed on the screen of the monitor 10. Here, the color adjustment unit 24 may provide image data for the preview scope window 32 to the image processing unit 22. FIG. 3 illustrates three profiles used in the present embodiment, i.e., a printer profile for the printer 30, a monitor profile for the monitor 10, and an input profile for an input device such as a scanner or a digital camera. If there exist a plurality of profiles, the user can change the printer profile, the monitor profile, or the input profile used for the host computer 20 to other profiles using "change" buttons and an "OK" button illustrated in FIG. 3. For the input profile, if the user does not specifically select any other option, an sRGB color space profile is selected as a default color profile. For the monitor profile and the printer profile, if the user does not select any other option, a default profile can be selected by the image processing apparatus.

Figure 4:
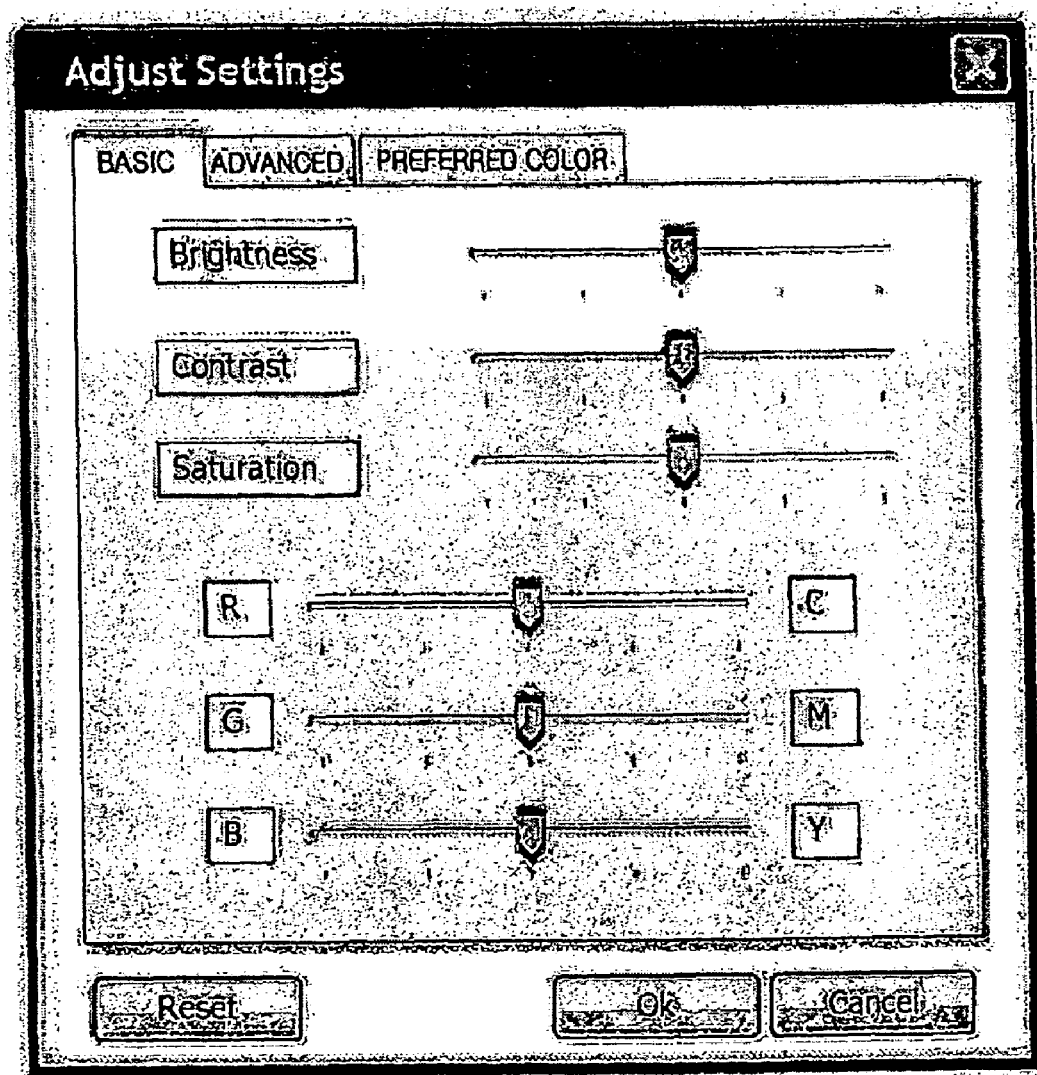
FIG. 4 is a view illustrating items included in a basic tab in a dialogue box for color adjustment in the image processing apparatus of FIG. 1.

When the user presses an adjustment button ADJUST of the preview scope window 32, the color adjustment unit 24 controls the image processing unit 22 so that a dialogue box for adjust settings illustrated in FIG. 4 is displayed on the screen of the monitor 10. The color adjustment unit 24 may provide the image processing unit 22 with image data for the adjust settings in the preview scope window 32 to display the adjust settings on the monitor 10. FIG. 4 illustrates brightness, contrast, and saturation, which are items included in a "basic" tab in a dialogue box for color adjustment. In an "advanced" tab, items, such as a function of adjusting a change of a toner with the lapse of time, a gamma curve controlling function, etc., can be included. In a "preferred color" tab, a function of editing a color of a specific band, such as a skin color or a sky color, can be provided. FIG. 5 illustrates items which can be adjusted through the dialogue box of FIG. 4. Color configuration information including the items illustrated in FIG. 5 is stored in the color configuration storage unit 27. Hereinafter, R-, G-, and B-gamma 1D tables illustrated in FIG. 5, the input profile, the monitor profile, and the printer profile are called 'color management parameters,' and brightness including relations to skin, sky, and grass, contrast, saturation, and color balances are called 'color adjustment parameters.' The user's adjustment related to skin, sky, and grass among the items illustrated in FIG. 5 can be obtained by representing the color adjustment parameters having correlations to each other with vectors. For example, in a case of the skin color, a vector whose components are brightness, contrast, and saturation is displayed on a user interface, and the three components of the skin color can be simultaneously adjusted by moving the vector through a mouse click of the user.

Figure 6:
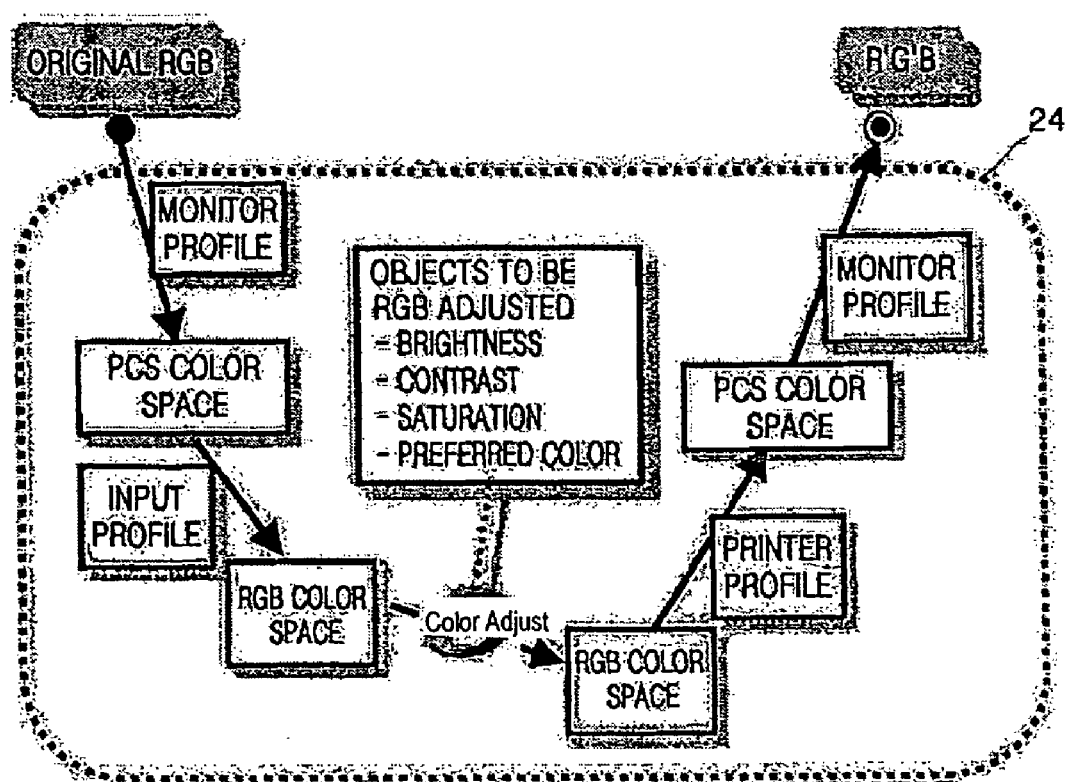
FIG. 6 is a conceptual diagram illustrating a color adjustment used for soft proof using a monitor in the image processing apparatus of FIG. 1.

FIG. 6 is a conceptual diagram illustrating a color adjustment used for the soft proof using the monitor 10 usable in the image processing system of FIG. 1. The color adjustment unit 24 performs a color adjustment of image data (original RGB) of a digital document captured by the data capture unit 23 and outputs the color adjusted image data R'G'B' to the image processing unit 22. When the color adjustment unit 24 performs the color adjustment, the color configuration management module 26 reads the input profile, the monitor profile, and the printer profile from the color configuration storage unit 27. When the captured image data (original RGB) is input to the color adjustment unit 24, the color conversion module 25 converts the captured image data (original RGB) to image data of the PCS color space based on the monitor profile and converts the image data of the PCS color space to image data of the RGB color space based on the input profile. Then, the color configuration management module 26 outputs color adjustment parameter(s) changed in response to a user's command among the color configuration parameters described in FIGS. 4 and 5 to the color conversion module 25. The color conversion module 25 performs the color adjustment of image data based on the color adjustment parameter(s) input from the color configuration management module 26.

The final result value of the color adjustment of the image data varies according to a sequence of adjusting the color adjustment parameters. To describe this, Equations 1 and 2 are used.

$$L' = L + L_{brightness} \quad (1)$$

$$L' = \frac{100}{100 - L_{contrast}}L + 128\frac{L_{contrast}}{L_{contrast} - 100} \quad (2)$$

It is assumed that luminance L=120, $L_{brightness}$=20, and $L_{contrast}$=20, and two examples will be described.

As one of the examples, when brightness is adjusted to +20 and then contrast is adjusted to +20, L' obtained by Equation 1 is used as L of Equation 2, and thus the final luminance becomes L' of Equation 2. In Equation 1, L'=120+40=140, and when this is used as L of Equation 2, the final L'=100/80*140−128*20/80=143.

As the other one of the examples, when contrast is adjusted to +20 and then brightness is adjusted to +20, L' obtained by Equation 2 is used as L of Equation 1, and thus the final luminance becomes L' of Equation 1. In Equation 2, L'=100/80*120−128*20/80=118, and when this is used as L of Equation 1, the final L'=118+20=138.

Thus, the final luminance can vary according to in the color adjustment sequence. The color configuration management module 26 stores the color configuration parameters and color adjustment history information used for the color adjustment of the image data in the color configuration storage unit 27.

The color conversion module 25 converts the color adjusted image data to image data of the PCS color space based on the selected printer profile and converts the converted image data of the PCS color space to image data R'G'B' of the RGB color space based on the monitor profile. The image data R'G'B' is output to the image processing unit 22, and the image processing unit 22 displays an image corresponding to the image data R'G'B' on the screen of the monitor 10. The user can repeatedly perform the color adjustment described in FIG. 6 while watching the image displayed on the screen of the monitor 10.

The data of the image in the preview scope window 32 among the data of the image displayed on the monitor screen is image data obtained by performing the color adjustment according to the user's input and the color conversion according to the selected printer profile. Thus, the image displayed on the monitor screen is a result obtained by simulating an output of the printer 30.

A user interface can be constructed so that the color adjustment parameters obtained by the color adjustment can be selected to be "stored" or "not stored" based on a storage option. That is, "storing changed contents" or "not storing (default storing)" can be provided as the storage option for storing changed color adjustment parameters in the color configuration storage unit 27. The user may or may not store the changed color adjustment parameters based on changed contents using the storage option.

Figure 7:
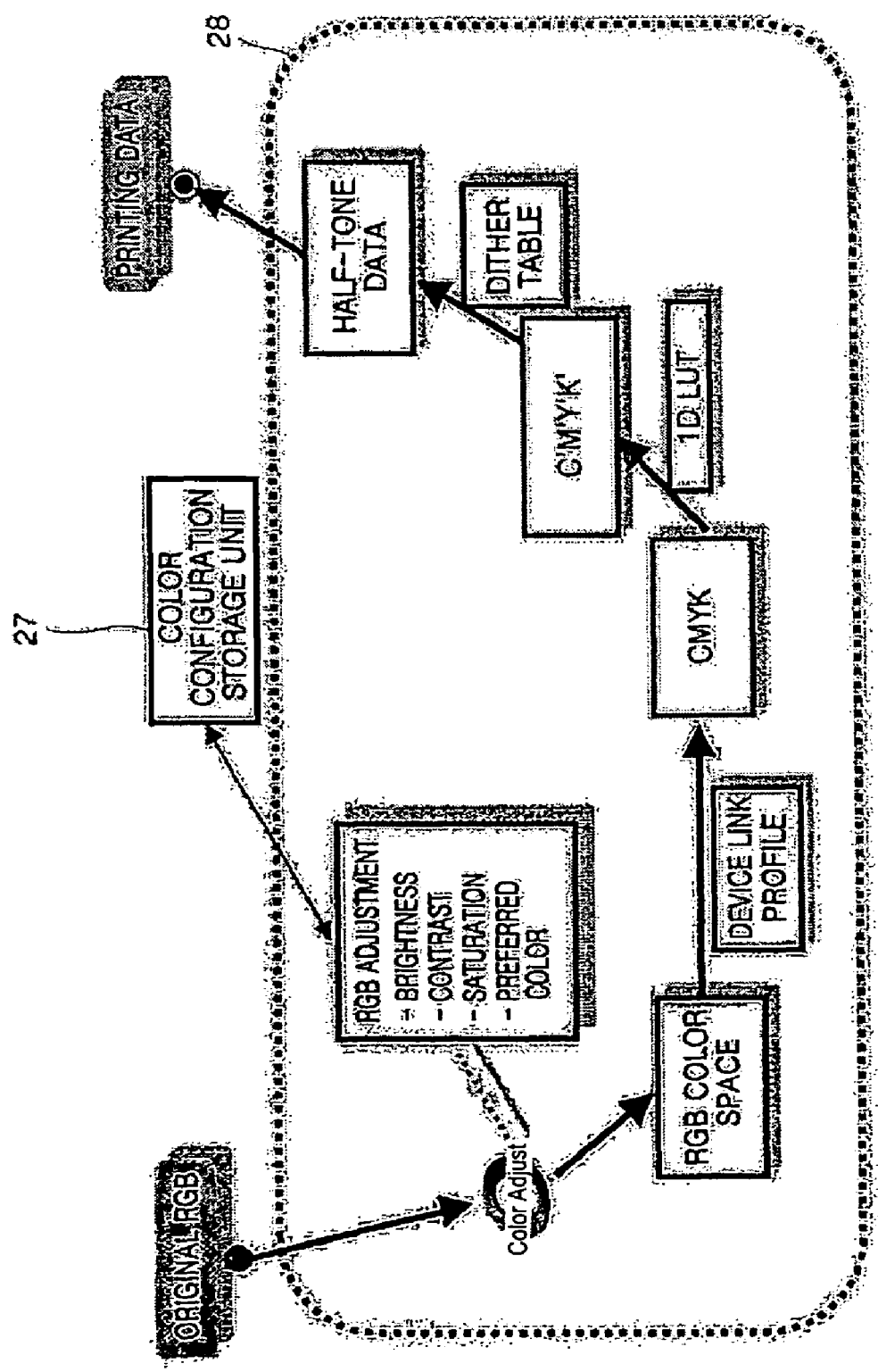
FIG. 7 is a conceptual diagram illustrating a printing operation performed by a printer driver in the image processing apparatus of FIG. 1.

When the user wants to print the image displayed on the monitor screen by the application 21 using the printer 30 after completing the color adjustment, the image data output from the application 21 is input to the printer driver 28. FIG. 7 is a conceptual diagram illustrating a printing operation performed by the printer driver 28 in the image processing system of FIG. 1. The printer driver 28 reads the color configuration parameters, including the color adjustment parameters, the color adjustment history information and the color management parameters, from the color configuration storage unit 27. The printer driver 28 performs the color adjustment (RGB adjust) of the image data (original RGB) input from the application 21 based on the color adjustment parameters to generate an RGB color space. The color adjusted image data of the RGB color space is converted to CMYK image data based on a device link profile, which is a color adjustment parameter, and converted to C'M'Y'K' image data by a one-dimensional lookup table 1D LUT.

The device link profile is unique for each printer driver and connects the RGB color space to the CMYK color space.

The one-dimensional lookup table 1D LUT can be used for compensating for a change of a toner with a lapse of time. The image data output from the one-dimensional lookup table 1D LUT is converted to half-tone data using a dither table, processed (formatted), and then output as the printing data from the printer driver 28. The printing data is output to the printer 30.

As described above, according to embodiments of the present general inventive concept, a user using a host computer can perform soft proof for matching colors reproduced on a monitor screen with colors reproduced on a printing medium using a soft proof apparatus.

In addition, since image processing for the soft proof is performed using color adjustment parameters and history information of the color adjustment parameters, the user can obtain an image optimized on a printing medium according to a user preference.

Furthermore, since a monitor profile and an input profile are used in a selected sequence, the soft proof can be performed using image data of an RGB color space.

While the input profile, the monitor profile, and the printer profile are stored in the color configuration storage unit 27, however, these profiles may be stored in other storage area different from the color configuration storage unit 27.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method of reproducing a first image displayed using a first application program on a screen of a display unit so as to simulate a color image to be printed on a printing medium using an image forming device, the method comprising:
    displaying a preview window of a second application program on the screen of the display unit;
    using the second application program to capture at least a portion of the first image displayed by the first application program on the screen of the display unit;
    receiving and storing a user's input for a color adjustment; and
    displaying a second image in the preview window of the second application program by performing color adjustment according to the user's input and color conversion according to a profile of the image forming device to the captured image, the color adjustment being performed on the color image according to the stored user's input when the color image is printed on the printing medium such that colors of the color image printed on the printing medium are identical with colors of the second image.

2. The method of claim 1, further comprising:
    receiving a user input relating to color configuration parameters to change at least a portion of colors of the first image; and
    using the second application program to change the at least a portion of colors of the first image according to the received color configuration parameters to generate an adjusted image and displaying the adjusted image in the preview window so as to simulate a color image to be printed on a Printing medium according to the received color configuration parameters.

3. The method of claim 2, further comprising:
    storing color configuration parameters indicating the changed portion of the colors.

4. The method of claim 3, wherein: the changing of the at least a portion of the colors comprises generating color configuration parameters indicating the changed portion of the colors of the first image and having a profile of the display unit, a profile of the image forming device, and color adjustment parameters;

the color adjustment parameters comprise preferred color editing parameters; and the color adjustment parameters are changed according to a user input signal.

5. The method of claim 4, wherein the generating of the color adjustment parameters comprises storing the color adjustment parameters together with corresponding color adjustment history information about the changed portion of the colors of the first image.

6. The method of claim 5, wherein the generating of the color adjustment history information comprises one of displaying the color adjustment history information through a user interface and printing the color adjustment history information through the image forming device.

7. The method of claim 5, wherein the generating of the color adjustment parameters comprises generating the color adjustment parameters including parameters to adjust brightness, contrast, saturation, color balances, and a change of a toner with a lapse of time and parameters to control a gamma curve.

8. The method of claim 4, wherein the preferred color editing parameters comprise brightness, chroma, and a color tone to be displayed as a single vector type on the display unit.

9. The method of claim 4, wherein the color configuration parameters comprise an input profile.

10. The method of claim 9, wherein:

the input profile comprises at least one of input profiles of a digital camera, a scanner, a cell phone, or an image capturing device; and the image is taken through the digital camera, the scanner, the cell phone, or the image capturing device.

11. The method of claim 9, wherein the input profile comprises an sRGB color space profile as a default input profile.

12. The method of claim 4, wherein the color configuration parameters comprise a plurality of profiles different from each other.

13. The method of claim 4, wherein:

the changing of the at least a portion of the colors of the first image is based on the color adjustment parameters and the corresponding color adjustment history information; and the changed at least a portion of the colors is obtained based on a device link profile defining a correlation between an RGB color space and a CMYK color space.

14. The method of claim 2, further comprising:

using a printer driver to generate a print data of the first image according to the received color configuration parameters; and printing the first image using the image forming device according to the received color configuration parameters.

15. The method of claim 1, further comprising:

selecting one of a storing option to store the color configuration parameters indicating the changed portion of the colors in a color configuration unit, and a non-storing option not to store the color configuration parameters indicating the changed portion of the colors.

16. An image processing apparatus having a first application program and a second application program that are usable with a display unit so as to simulate a color image to be printed on a printing medium withand an image forming device, the apparatus comprising:

a screen of the display unit to display a preview window of the second application program;

a data capture unit used by the second application program to capture data of at least a portion of an image displayed by the first application program on the screen of the display unit; and a color adjustment unit to convert the colors of the captured image so as to simulate a color image to be output the converted image to the image forming device to be printed on a printing medium;

a color configuration storage unit to store a profile of the image forming device and color configuration parameters changed by the color adjustment unit; and a printer driver to generate printing data from the image data based on the stored color configuration parameters, the color adjustment unit comprising:

a color configuration management unit to change the color configuration parameters of the image data captured by the data capture unit according to a user's input for color adjustment and read the profile of the image forming device from the color configuration storage unit; and a color conversion unit to perform color adjustment to the image data based on the changed color configuration parameters and color conversion to the image data according to the profile of the image forming device and to provide the color adjusted and converted image data to the display unit.

17. The apparatus of claim 16, wherein the color configuration parameters comprise color adjustment parameters, a profile of the display unit, and a profile of the image forming device, and the color adjustment parameters can be changed in response to a user input.

18. The apparatus of claim 16, wherein the color configuration management unit stores color adjustment parameters and corresponding color adjustment history information in the color configuration storage unit when a color adjustment is performed using the color adjustment parameters.

19. The apparatus of claim 18, further comprising:

a printer driver to generate printing data by processing data of an image reproduced on the screen of the display unit based on the color adjustment parameters and the corresponding color adjustment history information and performing color conversion of the image data based on a device link profile defining a correlation between an RGB color space and a CMYK color space.

20. An image processing method of reproducing a first image displayed using a first application program on a screen of a display unit so as to simulate a color image to be printed on a printing medium with an image processing apparatus, the method comprising:

with a second application program, capturing data of at least a portion of the first image displayed by the first application program on a screen of a display unit to be printed in an image forming device;

receiving and storing a user's input for color adjustment;

displaying a second image in a preview window of the second application program by performing color adjustment according to the user's input and color conversion according to a profile of the image forming device to the captured image, the color adjustment being performed to the color image according to the stored user's input when the color image is printed on the printing medium such that colors of the color image printed on the printing medium are identical with colors of the second image.

21. An image processing apparatus usable with a display unit and an image forming device to reproduce a first image displayed on a screen of the display unit so as to simulate a color image to be printed on a printing medium with the image forming device, the apparatus comprising:

an application unit to generate first image data of the first image;

an image processing unit to generate second image data of a second image to be displayed in a display unit, and to generate a window to display the second image therein;

a data capture unit to capture at least a portion of the first image;

a color adjustment unit to perform color adjustment according to a user's input for color adjustment and color conversion according to a profile of the image forming device to the captured image, wherein the window comprises a window to display profiles corresponding to the first image, the display unit, and the image forming device.

22. The apparatus of claim 21, wherein the window comprises an application window to display the second image according to a profile of the display unit, and a preview scope window to display at least one of the second image, the captured image, and the simulated color image.

23. The apparatus of claim 21, wherein the window displays adjust settings of the at least one of the parameters of the colors of the captured image.

24. The apparatus of claim 21, wherein the color adjustment unit adjusts the at least one of the parameter of the colors of one of the first image data and the captured image data by the data capture unit and outputs information on the adjusted at least one of the parameters to the image processing unit.

25. The apparatus of claim 21, wherein the color adjustment unit comprises a color configuration management module to store an input profile corresponding to the first image, a monitor profile corresponding to the display unit, and a printer profile corresponding to the image forming device, and a color conversion module to convert a color space of the captured image data to another color space of the simulated color image data based on the monitor profile and to convert the another color space of the simulated color image data to the color space of the captured image data according to the input profile.

26. The apparatus of claim 21, wherein the color adjustment unit comprises a color configuration management module to output the at least one of the parameters of the colors changed according to a user preference, and a color conversion module to perform color adjustment of the captured image data based on the at least one of the parameters input from the color configuration management module.

27. The apparatus of claim 21, wherein:
the first image data of the first image has an input color space;
the second image data of the second image has a monitor color space;
the captured image data of the captured image has the input color space;
the simulated color image data of the simulated color image has the monitor color space; and
print data to be printed has a printer color profile.

28. The apparatus of claim 21, wherein the colors of the simulated color image displayed in the window of the display unit are the same as colors of print date to be printed on the printing medium in the image forming device.

29. The apparatus of claim 21, wherein the image processing unit generates the window according to the generation of the first image data of the first image from the application unit.

30. A method of reproducing a first image displayed using a first application program on a display screen of a display unit so as to simulate a color image to be printed onto a printing medium with an image forming device, the method comprising:

selecting at least a portion of image data of the first image that is displayed on the display screen using a second application program to be printed on a printing medium;

receiving and storing user's input for color adjustment; and displaying a second image in preview window of the second application program by performing color adjustment according to the user's input and color conversion according to profile of the image forming device to the captured image, the color adjustment being performed to the color image according to the stored user's input when the color image is printed on the printing medium such that colors of the color image printed on the printing medium are identical with colors of the second image.

31. A non-transitory computer readable medium storing one or more programs, including instructions, which when executed by a computer, causes the computer to perform a method comprising:

displaying a preview window on a screen of a display unit;

using the preview window to capture at least a portion of a first image displayed by another application program on the screen of the display unit;

receiving and storing user's input for color adjustment; and displaying a second image in the preview window by performing color adjustment according to the user's input and color conversion according to profile of the image forming device to the captured image, the color adjustment being performed to the color image according to the stored user's input when the color image is printed on the printing medium such that colors of the color image printed on the printing medium are identical with colors of the second image.

32. The non-transitory computer readable medium of claim 31, wherein the method further comprises:

receiving an user input relating to color configuration parameters to change at least a portion of colors of the first image; and changing the at least a portion of colors of the first image according to the received color configuration parameters to generate an adjusted image and displaying the adjusted image in the preview window so as to simulate a color image to be printed on a printing medium according to the received color configuration parameters.

33. The non-transitory computer readable medium of claim 32, wherein the method further comprises:

using a printer driver to generate a print data of the first image according to the received color configuration parameters; and printing the first image using the image forming device according to the received color configuration parameters.

* * * * *